June 21, 1960     R. S. DAVIS     2,942,157
MOUNTING ARRANGEMENT FOR PLUG-IN TYPE PANELBOARD
Filed April 9, 1957     2 Sheets-Sheet 1
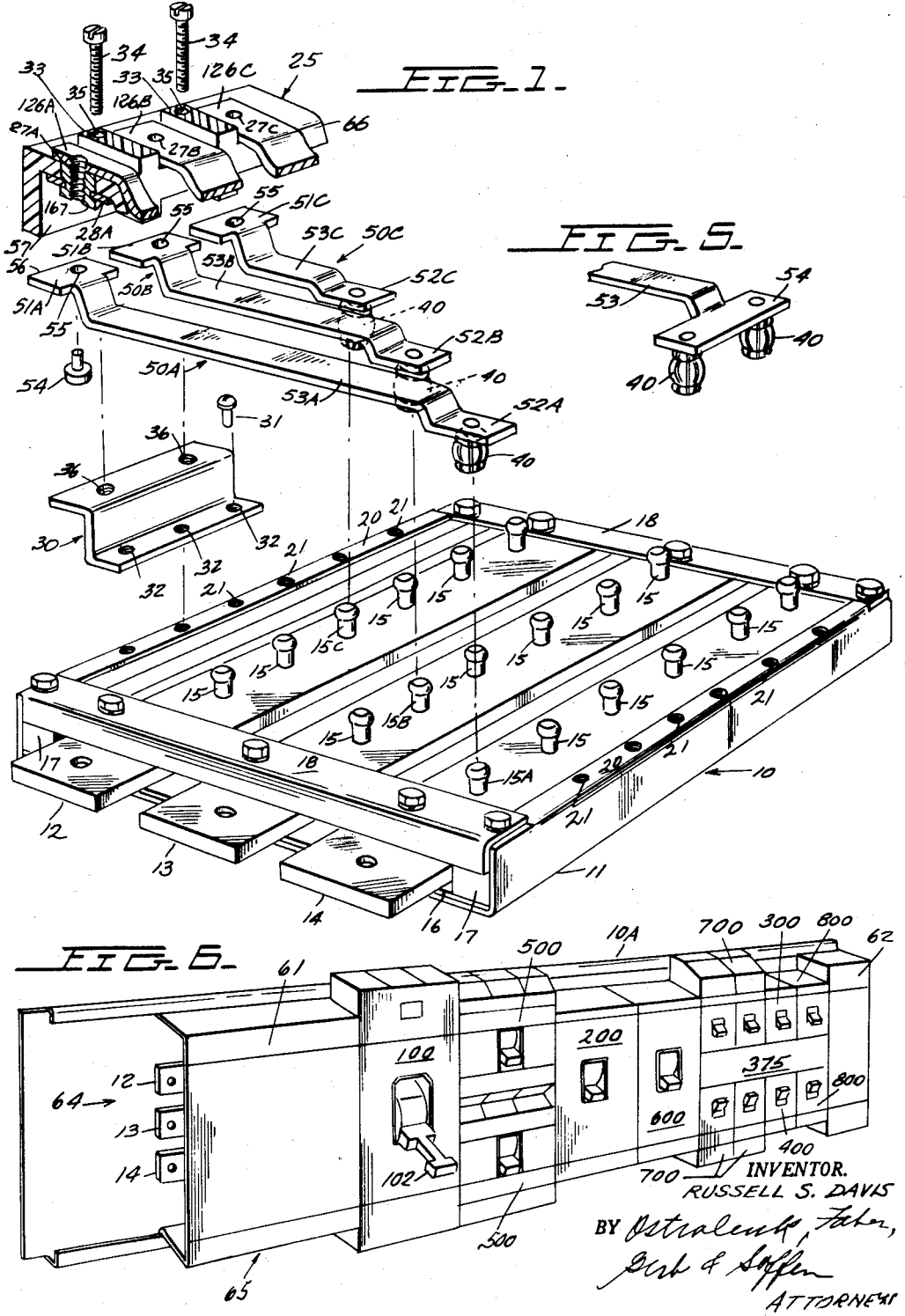

June 21, 1960 R. S. DAVIS 2,942,157
MOUNTING ARRANGEMENT FOR PLUG-IN TYPE PANELBOARD
Filed April 9, 1957 2 Sheets-Sheet 2
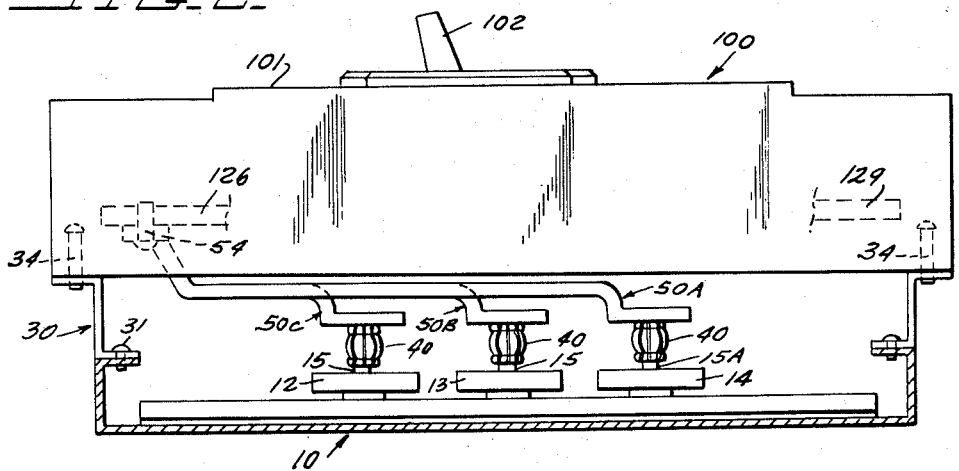
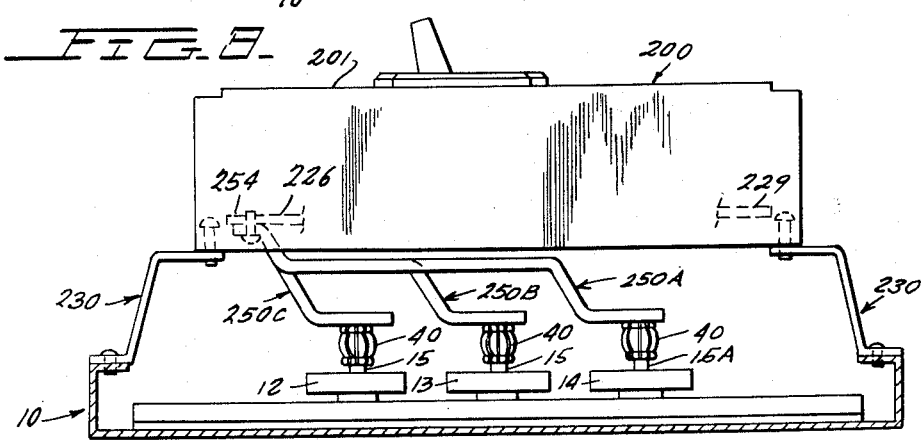
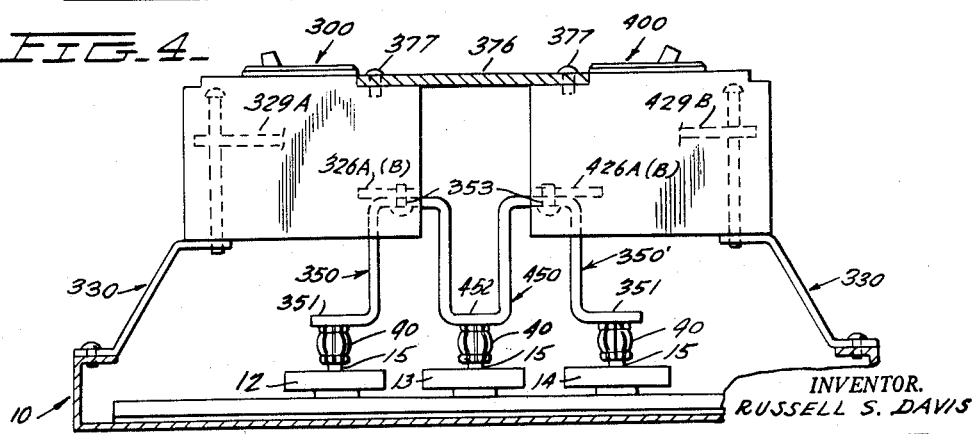
INVENTOR.
RUSSELL S. DAVIS
BY
ATTORNEYS

United States Patent Office 2,942,157
Patented June 21, 1960

2,942,157

MOUNTING ARRANGEMENT FOR PLUG-IN TYPE PANELBOARD

Russell S. Davis, Detroit, Mich., assignor, by mesne assignments, to I-T-E Circuit Breaker Company, Philadelphia, Pa., a corporation of Pennsylvania Filed Apr. 9, 1957, Ser. No. 651,753

2 Claims. (Cl. 317—119)

This invention relates to an arrangement for installing circuit interrupters to a panelboard assembly and more particularly to an arrangement wherein jumper straps are secured to the line terminals of the interrupter and extend downward therefrom to removably engage the main bus bars of the panelboard.

Heretofore panelboard constructions, especially for three phase, have been so limited that mounting of circuit interrupters of more than a single frame size to the same panelboard was an inconvenient if not impossible task. A typical arrangement consisted of straps secured to the bus bars and extending upward therefrom. The free ends of the straps were later connected to the line terminals of the circuit breaker. With this arrangement it was always necessary to interrupt the electrical source feeding the panelboard before installing or removing a circuit breaker so that the operator would not contact a hot bus, and required the making of blind connections when the line connections were made to the bottom of the circuit breaker. In order to connect the straps to the bus bars it was necessary to drill and tap the bus bars. Drilling reduces the cross section, increasing the resistance, especially when a strap is removed and the hole is left unplugged, thus increasing the heating of the panelboard.

Other arrangements required costly insulating blocks or else mounted the circuit breakers so that the line terminals were in a line perpendicular to the bus bars thus requiring the load connections to extend above the bus bars.

This invention provides an efficient arrangement for installing a circuit breaker in any location in a panelboard assembly independent of the size of the circuit breaker or the location of its line terminals. The panelboard assembly is constructed with bus bars having equally spaced knobs projecting therefrom with the space between the knobs being of a predetermined length. The knobs may be secured to the bus bars by threading, riveting, or preferably by extruding therefrom as disclosed in copending application Serial No. 614,955, filed October 9, 1956, and assigned to the assignee of the instant invention. Circuit breakers extend across the bus bars from one mounting ledge of the panelboard to the other mounting ledge to bridge the space therebetween with the circuit breaker line terminals being in a line parallel to the direction of the bus bars. The circuit breakers will rest directly on the mounting ledges or else on brackets secured to the mounting ledges. These brackets are formed to raise the height of the circuit breaker and/or compensate for the differences in length between the circuit breakers and distance between mounting ledges so that the top surfaces of breakers having different frame sizes are all in the same plane when mounted on the panelboard. Extending from each line terminal of the circuit interrupter is a formed conducting strap having a tulip connector secured to the free end. The tulip connector is disclosed in copending application Serial No. 476,334, filed December 20, 1954, and assigned to the I-T-E Circuit Breaker Company, and now abandoned. Each jumper strap is of a different length so that the tulip connectors thereon will mate with knobs on different bus bars. Since the bus bars and knobs thereon are evenly spaced a predetermined distance apart, the straps for a particular circuit breaker may be formed in the factory to predetermined specifications. For high current applications, the straps may contain more than one tulip connector to mate with more than one knob of the bus bar.

With this arrangement circuit breakers of different frame sizes or different current ratings can be plugged into the panelboard at any location. Additional units may be added in the field without previously having determined their locations when the panelboard was built. Field assembly is readily accomplished by inexperienced help. All blind bolted field connections are eliminated thus enabling the installation and removal of circuit interrupters without removing the electrical power to the panelboard.

Accordingly, a primary object of this invention is to provide a flexible panelboard mounting arrangement wherein offset straps are secured to and extend from the line terminals of the circuit breakers and are removably engaged with the bus bars of the panelboard.

Another object is to provide a mounting arrangement wherein circuit breakers having different frame sizes may be mounted in any location to the same panelboard.

Still another object is to eliminate blind electrical connections.

A further object is to provide a mounting arrangement wherein circuit breakers may be safely installed or removed without interrupting the electrical source feeding the panelboard.

A still further object is to eliminate the use of tools in making the electrical connection to the bus bars of the panelboard.

Another object is to eliminate drilling and tapping of the main bus bars and the danger of cross threading.

Another object is to utilize flat conductors for the panelboard.

Another object is to provide a vibration proof electrical connection to the bus bars.

Another object is to provide a shallow panelboard construction.

These and other objects of my invention will become more apparent after reading the following description taken in connection with the accompanying drawings in which:

Figure 1 is an exploded view illustrating my novel panelboard, a fragment of a circuit breaker and the connecting straps.

Figure 2 is a side elevation showing a complete circuit breaker of Figure 1 mounted to the panelboard.

Figure 3 is a side elevation similar to Figure 2 wherein a circuit breaker having a smaller frame size is mounted to the same panelboard.

Figure 4 is a side elevation similar to Figure 2 wherein two double branch circuit breakers are mounted back to back across the panelboard.

Figure 5 is a fragment of a conducting strap having two tulips thereon.

Figure 6 is a perspective view of a bus run including a panelboard section wherein circuit breakers of various frame sizes are mounted.

Referring to the figures, and more particularly to Figure 6, parallel spaced bus bars 12, 13 and 14 comprising a bus run 64 are enclosed in housing 65. Cover 61 encloses one end of the housing 65 and spaced therefrom is a second cover 62 which encloses the other end of housing 65. A panelboard 10A occupies the area between covers 61 and 62. Circuit breakers 100, 200, 300, 400, 500, 600, 700 and 800 being of many and varied frame sizes are mounted on the panelboard 10A. The circuit breakers 300, 400, 700 and 800, not being large enough to extend across the entire width of the panelboard 10A, are mounted back to back and are connected by strip 375.

Now referring to Figures 1 and 2, a panelboard 10 which may typically be positioned in the bus run of bus bars 12, 13 and 14 consists of a frame 11 having parallel mounting ledges 20 with tapped holes 21 spaced at intervals along the mounting ledges 20. The flat bus bars 12, 13 and 14 are positioned and insulated from the frame 11 by means of blocks 17 and 18 and insulating sheet 16. Projecting at equally spaced intervals along bus bars 12, 13 and 14 are knobs 15. The knobs 15 on bus bars 12, 13 and 14 are in a line perpendicular to the axis of the bus bars.

The use of a reference numeral, without the letter A, B or C following, is used to indicate that the reference to that numeral is equally applicable to all reference characters containing the numeral.

The fragment 25 of circuit breaker 100 contains line terminals 126A, 126B and 126C insulated and spaced from one another by means of barriers 33 which are part of the case 66. The terminal 126 have rounded portions 167 which extend to a bottom surface of the circuit breaker 100. Each of the line terminals 126 has a tapped hole 27 cut therethrough. A series of conducting straps 50A, 50B, 50C are secured at one of their ends to the respective line terminals 126A, 126B, 126C by means of screws 54 which project through clearance holes 55 in the conducting straps 50 and mate with the tapped holes 27. Surfaces 56 of the conducting straps 50 abut a surface 57 of one of the case recesses and thereby prevent rotation of the conduction straps 50. Each conducting strap 50 comprises a first section 51 and a second section 52 which is parallel to section 51 and offset therefrom. Sections 51 and 52 are interconnected by rigid connecting section 53. Tulip connectors 40, which are described more fully in copending application Serial No. 476,334, filed December 20, 1954, and assigned to the I-T-E Circuit Breaker Company, or other gripping means, are secured to each of the second sections 52.

Mounting brackets 30 are interposed between circuit breaker 100 and the panelboard 10. The brackets 30 serve to elevate the circuit breaker 100 and to compensate for any difference between the length of the circuit breaker 100 and the width of the panelboard 10. The mounting brackets 30 are secured to the mounting ledges 20 by means of screws 31 which pass through clearance holes 32 in the mounting brackets and mate with tapped holes 21. Screws 34 pass through clearance holes 35 in barriers 33 and mate with tapped holes 36 of the mounting brackets 30 and serve to secure circuit breaker 100 to the mounting brackets. When the circuit breaker 100 is positioned on the mounting brackets 30, the tulip 40 of strap 50A will mate with knob 15A of bus bar 14, tulip 40 of strap 50B will mate with knob 15B of bus bar 13 and tulip 40 of strap 50C will mate with knob 15C of bus bar 12. The alignment of the tulips 40 with respect to knobs 15A, 15B and 15C is automatic since the respective lengths of straps 50A, 50B and 50C may be predetermined in view of the fact that the spacing between knobs 15 of any bus bar is uniform and predetermined as is the spacing between the knobs 15 and the mounting ledges 20.

Since the circuit breaker 100 is mounted lengthwise across the panelboard 10, the load terminals 129 are in a line parallel to the bus bars 12, 13 and 14. This enables all load connections to be made over the edge of the panelboard rather than from the ends.

In this manner, by knowing the respective frame sizes, the location of the mounting holes and the spacing between line terminals of any circuit breaker, a suitably shaped set of mounting brackets and a suitably shaped set of conducting straps may be prefabricated to mount this circuit breaker to any location on the panelboard 10. As seen in Figure 5, two tulips 40 are secured to the second section 54 of a conducting strap. In this manner a larger flow of current may safely be handled than is the case when but a single tulip 40 is relied upon to engage a single knob 15.

Referring more particularly to Figure 3, a circuit breaker 200 having line terminals 226 and load terminals 229 is secured to the same panelboard 10 by means of mounting brackets 230 and the electrical connections between the line terminals 226 are accomplished by means of conducting straps 250A, 250B and 250C. The frame size of circuit breaker 200 is smaller than the frame size of circuit breaker 100 necessitating differently shaped mounting brackets. The mounting brackets 230 will not only compensate for the difference between the length of the circuit breaker 200 and the width of the panelboard 10, but will also elevate the circuit breaker 200 so that its top surface 201 will be in the same plane with the top surface 101 of circuit breaker 100. Similarly, the line terminals 226 of circuit breaker 200 are differently positioned with respect to the knobs 15 from that of the line terminals 126 of circuit breaker 100 and because of this the conducting straps 250A, 250B and 250C are shaped differently from the conducting straps 50, but both sets of conducting straps being of a predetermined shape will have their tulip connectors 40 in alignment with knobs 15A, 15B and 15C, respectively, of bus bars 12, 13 and 14.

In Figure 4, two identical double branch circuit breakers 300 and 400 are shown mounted back to back on panelboard 10 by means of mounting brackets 330. The electrical connections between knobs 15 and the line terminals 326A, 326B, 426A and 426B are accomplished by means of three straps designated as 350, 350' and 450. Straps 350 and 350' are each Z-shaped with a tulip connector 40 secured to lower arms 351. The upper arms 353 of conducting straps 350 and 350' are secured to line terminals 326A and 426A respectively by means of screws 354. Conducting strap 450 is a U-shaped member having flanges 451 extending outwardly from the top ends of the arms thereof. A tulip connector 40 is secured to the central portion 452 of the conducting strap 450. The flanges 451 are secured to line terminals 326B and 426B by means of screws 454. A portion 376 of the center strip 375 serves to fill in the space between the circuit breakers 300 and 400. The circuit breakers 300 and 400 together with their conducting straps 350, 350' and 450 are installed and removed as an integral unit.

The electrical connections between the conducting straps and bus bars have been described as comprising knobs projecting from flat bus bars which are received by tulip connectors secured to the conducting straps. This is a conveniently removable connection which may be made or broken without the interruption of the power to the panelboard and without the use of tools. However, the removable connections may be made with a stab and receiving pocket or with clips engaging round bus bars.

In accordance with this invention, the circuit breaker 100 is mounted to a panelboard 10 by the following procedure:

(1) Choose the appropriately shaped and sized mounting brackets 30 and conducting straps 50 which have been fabricated in accordance with the combined dimensions of the panelboard 10 and circuit breaker 100.

(2) Firmly secure conducting straps 50A, 50B and 50C to the bottom of the line terminals 126A, 126B and 126C by means of screws 54 so that the straps 50 extend downwardly from the bottom of circuit breaker 100.

(3) Secure mounting brackets 30 to the mounting ledges 20 by means of screws 31.

(4) With the operating handle 102 in the off position, place the circuit breaker 100 lengthwise across the panelboard 10 with the tulips 40 on conducting straps 50A, 50B and 50C gripping knobs 15A, 15B and 15C respectively. At this time the circuit breaker 100 will bridge the gap between mounting brackets 30 and will be resting thereon. Holes 35 and 36 will be in alignment so that the circuit breaker 100 may be mechanically fastened by means of screws 34.

A similar mounting procedure may be used for circuit breakers of different frame sizes or having different line terminal locations.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. The combination of a panelboard assembly and at least one circuit breaker mounted thereto; said panelboard assembly comprising a frame having parallel mounting ledges and a plurality of parallel spaced bus bars positioned in the same plane and disposed within said frame, said bus bars being parallel to said mounting ledges, each of said bus bars including a plurality of equally spaced identical electrical connecting means projecting therefrom and positioned in a row extending parallel to the longitudinal axis of the associated bus bar; each of said circuit breakers having at least one line terminal and at least one load terminal; a rigid conducting strap for each of said line terminals; each of said rigid conducting straps comprising a first section, a second section, a connecting section; said first section being parallel to said second section and offset therefrom; said first section extending from a first end of said connecting section; said second section extending from a second end of said connecting section; said second section including at least two electrical connecting means removably engaged to an equal number of said electrical connecting means of one of said bus bars; each of said first sections being rigidly secured to one of said line terminals; said load terminals being positioned for wiring from one of the mounting ledge sides of said panelboard assembly.

2. The combination of a panelboard assembly and a circuit breaker mounted thereto; said panelboard assembly comprising a frame having parallel mounting ledges, a first, a second, and a third bus bar positioned in a single plane and disposed within said frame; said bus bars being parallel to said mounting ledges; a plurality of equally spaced identical electrical connecting means projecting from each of said bus bars and positioned in a row extending parallel to the longitudinal axis of their associated bus bar; each of said circuit breakers being a three phase unit having a line terminal and a load terminal for each of the phases thereof; a rigid conducting strap for each of said line terminals; each of said rigid conducting straps comprising a first section, a second section, a connecting section; said first section being parallel to said second section and offset therefrom; said first section extending from a first end of said connecting section; said second section extending from a second end of said connecting section; an electrical connecting means mounted to the second section of each of said straps and removably engaged with one of said bus bar electrical connecting means; each of said first sections being rigidly secured to a different one of said line terminals; the connecting sections of each of said straps being of different length whereby each of said second section electrical connecting means is connected to a different one of said bus bars; said load terminals being positioned for wiring from one of the mounting ledge sides of said panelboard assembly; said strap electrical connecting means being disengageable from said bus bar electrical connecting means without the use of tools and without first disconnecting said straps from said line terminals.

References Cited in the file of this patent

UNITED STATES PATENTS

| | | |
|---|---|---|
| 2,576,396 | Green | Nov. 27, 1951 |
| 2,626,984 | Cole | Jan. 27, 1953 |
| 2,632,039 | Hammerly | Mar. 17, 1953 |
| 2,645,725 | Miller | July 14, 1953 |
| 2,707,761 | Page | May 3, 1955 |
| 2,735,043 | Speck | Feb. 14, 1956 |
| 2,737,613 | Morris | Mar. 6, 1956 |
| 2,739,208 | Ullrich | Mar. 20, 1956 |
| 2,739,272 | Norden | Mar. 20, 1956 |
| 2,790,113 | Brown | Apr. 23, 1957 |
| 2,846,545 | Edmunds | Aug. 5, 1958 |